United States Patent
Kao et al.

(10) Patent No.: US 10,171,876 B2
(45) Date of Patent: Jan. 1, 2019

(54) MEDIA SWITCH DEVICE, MEDIA SWITCH SYSTEM AND MEDIA SWITCH METHOD

(71) Applicant: ATEN International Co., Ltd., New Taipei (TW)

(72) Inventors: Kuo Feng Kao, New Taipei (TW); Hsing-Ju Shih, New Taipei (TW)

(73) Assignee: ATEN INTERNATIONAL CO., LTD., New Taipei (TW)

(*) Notice: Subject to any disclaimer, the term of this patent is extended or adjusted under 35 U.S.C. 154(b) by 0 days.

(21) Appl. No.: 16/025,651

(22) Filed: Jul. 2, 2018

(65) Prior Publication Data

US 2018/0316971 A1    Nov. 1, 2018

Related U.S. Application Data

(62) Division of application No. 15/695,425, filed on Sep. 5, 2017, now Pat. No. 10,045,081.

(30) Foreign Application Priority Data

Sep. 6, 2016 (TW) .............................. 105213726 U

(51) Int. Cl.
*H04N 21/462* (2011.01)
*H04N 21/63* (2011.01)
*H04N 5/268* (2006.01)
*H04N 21/436* (2011.01)
*G09G 5/00* (2006.01)

(52) U.S. Cl.
CPC ............ *H04N 21/4622* (2013.01); *G09G 5/00* (2013.01); *H04N 5/268* (2013.01); *H04N 21/436* (2013.01); *H04N 21/63* (2013.01)

(58) Field of Classification Search
CPC ........................... H04N 21/4622; H04N 21/63
See application file for complete search history.

(56) References Cited

U.S. PATENT DOCUMENTS

| | | | |
|---|---|---|---|
| 8,788,718 B2 | 7/2014 | Lida et al. | |
| 2013/0086622 A1* | 4/2013 | Narushima | H04N 21/43635 725/138 |
| 2016/0140075 A1* | 5/2016 | Kashyap | G06F 13/4265 710/104 |

* cited by examiner

*Primary Examiner* — Michael E Teitelbaum
(74) *Attorney, Agent, or Firm* — Chen Yoshimura LLP

(57) ABSTRACT

A media switch device includes at least one media input port, a media input/extension composite port, a media output port, a media switch unit and a command switching and control module. The command switching and control module receives a response command from the media input/extension composite port to determine whether the media input/extension composite port is connected to a source device or to another media switch device. The command switching and control module receives a query command from the media output port to determine whether the media output port is connected to a sink device or to another media switch device. Related media switch system and method are also disclosed.

9 Claims, 7 Drawing Sheets

MEDIA SWITCH DEVICE, MEDIA SWITCH SYSTEM AND MEDIA SWITCH METHOD

BACKGROUND OF THE INVENTION

Field of the Invention

This invention relates to media switch devices, and in particular, it relates to media switch devices suitable for serial connections.

Description of Related Art

With the development of technology, media and media devices are widely used in homes. Source devices, such as DVD players, game machines and set-top boxes are used to generate and transmit media content. Sink devices, such as television set, projectors, etc. are used to receive media content and display it to the user. Connection ports are used to transmit media signals between the source devices and the sink devices. If the number of connection ports on the sink device is not enough, media switch devices can be used to expand the number of source devices that can be connected.

FIG. 1A is a block diagram showing a conventional media switch device and related applications. FIG. 1B is a front view of a conventional remote control device, which may be used to control the media switch device of FIG. 1A. Referring to FIGS. 1A and 1B, the media switch device 100 includes a switching unit 110, media output port 120 and four media input ports 130 (130a, 130b, 130c and 130d). The media output port 120 and the media input ports 130 are preferably High Definition Multimedia Interface (HDMI) ports, and are connected to the switching unit 110. The media input ports 130 (130a, 130b, 130c and 130d) are configured to be connected to different source devices 50 (50a, 50b, 50c an 50d), for transmitting the media content from the source devices 50a, 50b, 50c an 50d to the switching unit 110. The media output port 120 is coupled to the sink device 60, configure to transmit the media content from the switching unit 110 to the sink device 60.

The user may use the remote control device 140 to remotely control the media switch device 100, to switch the switching unit 110 to a desired source device 50, so that the sink device 60 can display the media content generated by this source device 50. More specifically, the keys 142 (142a, 142b, 142c, 142d) respectively correspond to the media input ports 130 (130a, 130b, 130c, 130d). For example, when the user presses the key 142c, the switching unit 110 will be switched to the media input port 130c, so that the media content output by the source device 50c is transmitted via the media output port 120 to the sink device 60.

Further, the key 144 (144a, 144b) of the remote control device 140 are "up" and "down" keys that can be used to switch from the current input port 130 to another media input port 130. For example, in the above example, when the current connected media input port is 130c corresponding to a serial number 3, and the user presses the "up" key 144a, the switching unit 110 will be switched to media input port 130d corresponding to a serial number 4. On the other hand, in the above example, when the current connected media input port is 130c and the user presses the "down" key 144b, the switching unit 110 will be switched to the media input port 130b corresponding to a serial number 2.

However, when the number of sink devices connected to the user's system further increases, the number of ports of a single media switch device 100 will not be sufficient, so multiple media switch devices 100 may be connected in series in order to connect all of the source devices. In such a case, the user must use multiple remote control devices 140 to respectively control the corresponding media switch devices 100, which is very inconvenient for the user.

SUMMARY

The present invention provides a media switch device suitable for serial connection, so that when multiple such media switch devices are connected in series, they can distinguish the relative connection relation of each other, and can allow a single remote control device to be operated to switch to a desired media input port.

In one embodiment of the present invention, the media switch device includes at least one media input port, a media input/extension composite port, a media output port, a video switching unit and a command switching and control module. Each media input port is configured to be coupled to a source device to receive media signals. The media input/extension composite port is configured to be coupled to either a source device to receive media signals or to a second media switch device. The media output port is configured to be coupled to either a sink device to output media signals or to a third media switch device. The video switching unit is coupled to the media input ports, the media input/extension composite port and the media output port, and is configured to switch a video portion of the media signals from one of the media input ports or the media input/extension composite port to the media output port. The command switching and control module is coupled to the media input ports, the media input/extension composite port and the media output port, and is configured to switch a command portion of the media signals from one of the media input ports or the media input/extension composite port to the media output port. The command switching and control module is coupled to the video switching unit to control the switching operation of the video switching unit. The command switching and control module is also configured to receive response commands from the media input/extension composite port to determine, based on the response commands or the lack thereof, whether the media input/extension composite port is coupled to a source device or a second media switch device. The command switching and control module is further configured to receive query commands from the media output port to determine, based on the query commands or lack thereof, whether the media output port is coupled to a sink device or a third media switch device.

In another embodiment, a media switch system includes a plurality of the above media switch devices connected in series.

In another embodiment, a media switching method is implemented in a media switch device, the media switch device comprising at least one media input port, a media input/extension composite port, and a media output port, the media input/extension composite port configured to be coupled to either a source device or to another media switch device, the media output port configured to be coupled to either a sink device or to yet another media switch device, the at least one media input port each configured to be coupled to a source device. The media switching method includes: receiving a response command from the media input/extension composite port to determine whether the media input/extension composite port is coupled to a source device or another media switch device; and receiving a query command from the media output port to determine whether the media output port is coupled to a sink device or yet another media switch device.

DETAILED DESCRIPTION OF PREFERRED EMBODIMENTS

Figure 2:
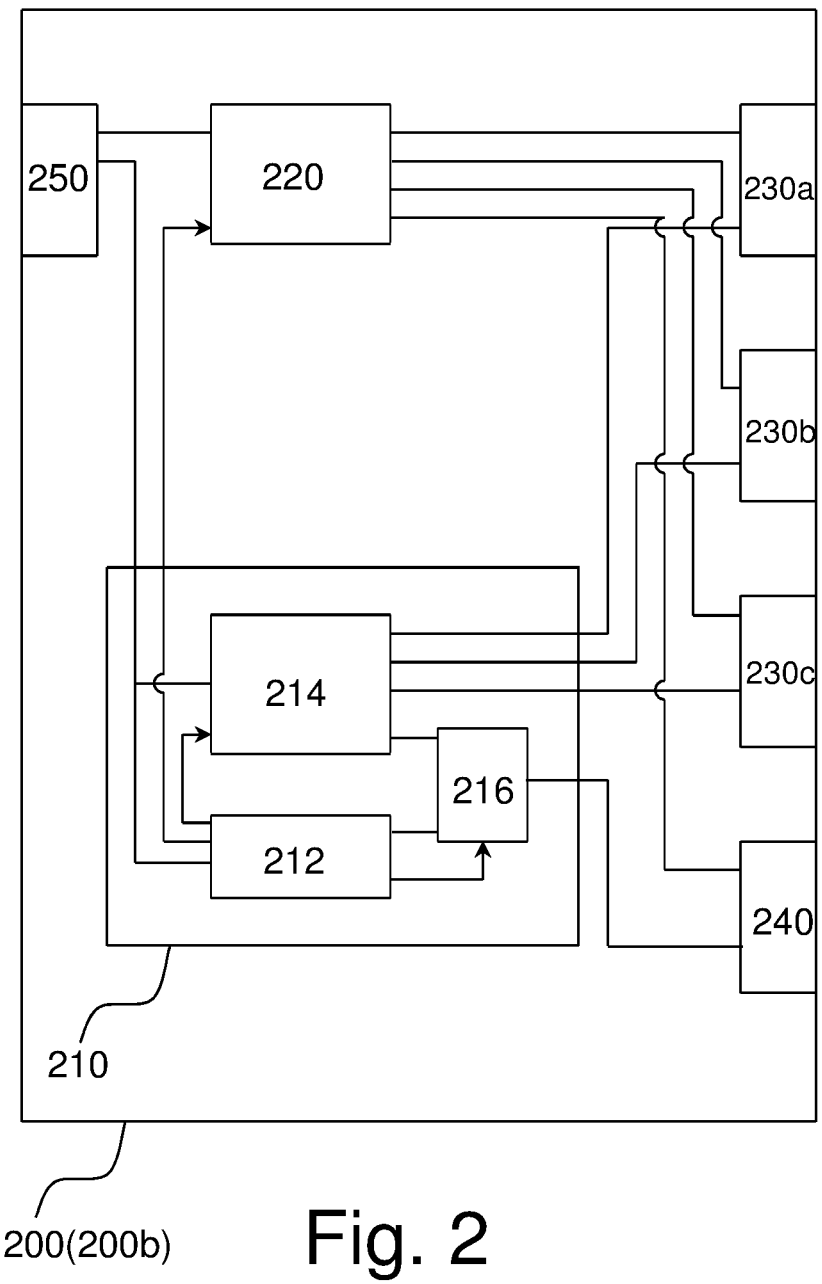
FIG. 2 is a block diagram illustrating a media switch device according to an embodiment of the present invention.
Figure 3:
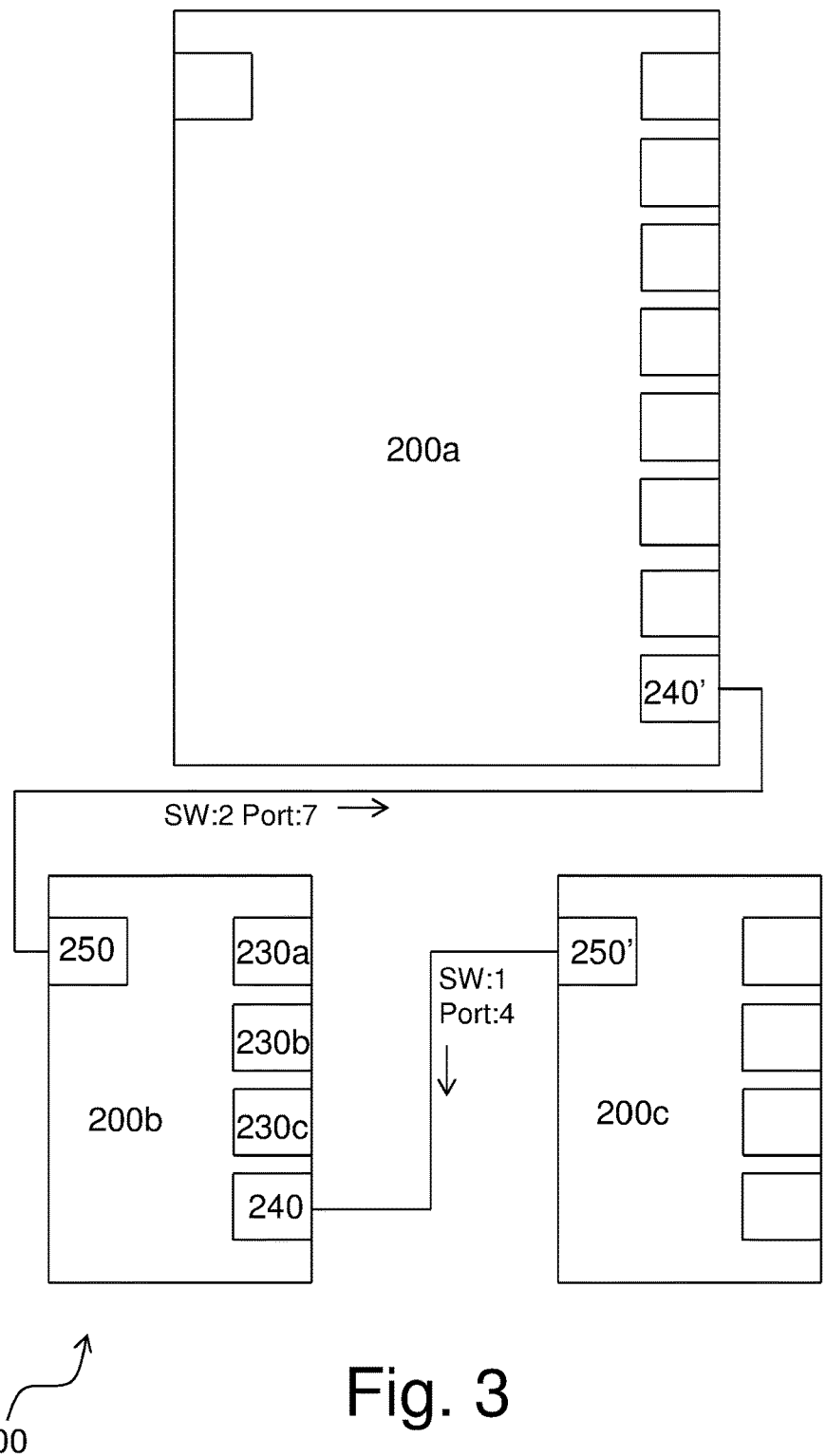
FIG. 3 is a block diagram illustrating a media switch system according to an embodiment of the present invention.

FIG. 2 is a block diagram illustrating a media switch device according to an embodiment of the present invention. FIG. 3 is a block diagram illustrating a media switch system according to an embodiment of the present invention. Referring to FIGS. 2 and 3, the media switch system 300 includes multiple serial-connected media switch devices 200 (200a, 200b, 200c). Three media switch devices 200 are used here for purpose of explanation; the invention is not limited to a particular number of media switch devices 200. To avoid overcrowding, FIG. 3 does not depict all internal components of the media switch devices 200; the internal components of the media switch device 200b are shown in FIG. 2, and the structures of media switch devices 200a and 200c are similar to the media switch device 200b.

The media switch device 200b includes a command switching and control module 210, a video switching unit 220, three media input ports 230 (230a, 230b, 230c), a media input/extension composite port 240, and a media output port 250. It should be noted that while three media input ports 230 are used here for illustration purposes, the invention is not limited to particular numbers of media input ports 230. For example, the media switch device 200a has seven media input ports (not labeled in FIG. 3).

Figure 1A:
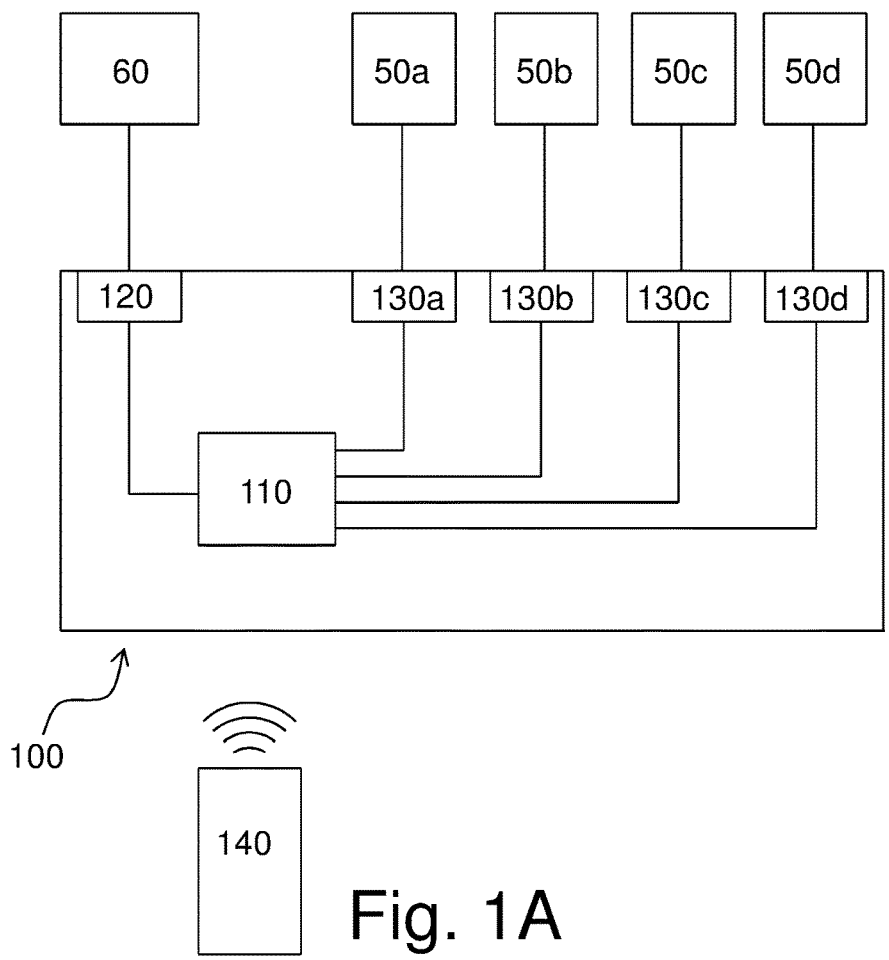
FIG. 1A is a block diagram illustrating a conventional media switch device and related operation.
Figure 1B:
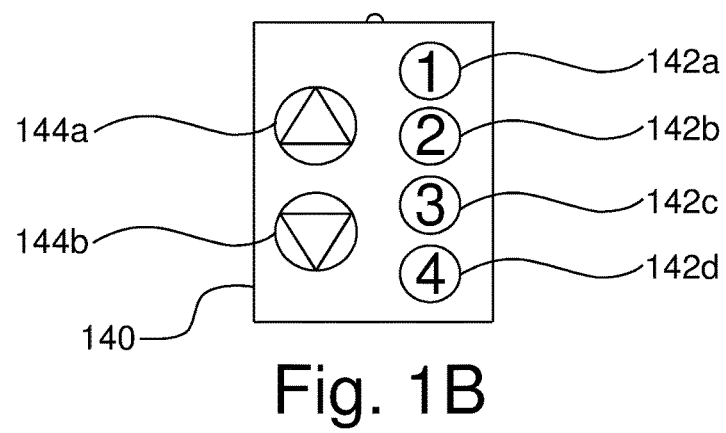
FIG. 1B is a front view of a conventional remote control device.

The media input ports 230 and the media input/extension composite port 240 are configured to be coupled to source devices (such as the source device 50 shown in FIG. 1) to receive media signals. The media output port 250 is configured to be coupled to a sink device (such as the source device shown in FIG. 1) to output media signals. Thus, the single media switch device 200b can couple to up to four source devices. When there is a need to expand the number of source devices, the media input/extension composite port 240 of the media switch device 200b may be coupled to the media output port 250' of another media switch device 200c, or the media output port 250 of the media switch device 200b may be coupled to the media input/extension composite port 240' of another media switch device 200c. This way, multiple media switch devices 200 are connected in series.

Referring to FIG. 2, in the media switch device 200, the command switching and control module 210 is coupled to the media input ports 230, the media input/extension composite port 240, the media output port 250 and the video switching unit 220, and is configured to switch a command portion of the media signal received from one of the media input ports 230 or the media input/extension composite port 240 to the media output port 250. Similarly, the video switching unit 220 is coupled to the media input ports 230, the media input/extension composite port 240 and the media output port 250; the command switching and control module 210 controls the video switching unit 220 to switch the video portion of the media signals received from one of the media input ports 230 or the media input/extension composite port 240 to the media output port 250.

In this embodiment, the media signal may be, for example, High Definition Multimedia Interface (HDMI) signal. The media signal includes a video portion and a command portion. The video portion may be high frequency signals transmitted using, for example, the Transition Minimized Differential Signaling (TMDS) channel, while the command portion may be low frequency signals transmitted using, for example, the Consumer Electronics Control (CEC) channel, the Display Data Channel (DDC), or the Hot Plug Detect (HPD) channel. It should be noted that this invention is not limited to the types of the media signals; for example, the media signal may also be Mobile High-definition Link (MHL) signals, etc. Those skilled in the relevant art can readily adapt the embodiments for other types of media signals based on the disclosure herein.

Referring again to FIGS. 2 and 3, the media switch devices 200 can determine the connection relationships among themselves by using the query commands and response commands defined by embodiments of the present invention. Using the media switch device 200b as an example, the command switching and control module 210 first transmits a query command to the media input/extension composite port 240. If the media input/extension composite port 240 is coupled to a source device, because the query command is not a command used in the relevant communication protocol, the source device will not be able to respond to the query, and as a result, no signal or command is returned via the media input/extension composite port 240 to the command switching and control module 210. But if the media input/extension composite port 240 is coupled to the media output port 250' of the media switch device 200c (as shown in FIG. 3), then the query command will be transmitted from the media output port 250' to the media switch device 200c. The media switch device 200 can determine the nature of this query command, and will transmit a response command via the media output port 250' and media input/extension composite port 240. Thus, the command switching and control module 210 can, based on whether an appropriate response command is received at the media input/extension composite port 240, determine whether the media input/extension composite port 240 is coupled to a source device or another media switch device 200c.

At the media output port 250, if this port is coupled to a sink device, then the sink device will not transmit the predetermined query command; as a result, the command switching and control module 210 will receive no query command from the media output port 250. On the other hand, if the media output port 250 is coupled to a media input/extension composite port 240' of another media switch device 200*a* (as shown in FIG. 3), then as described earlier, the media switch device 200*a* will transmit a query command via the media input/extension composite port 240' and the media output port 250 to the command switching and control module 210. Thus, the command switching and control module 210 can, based on whether an appropriate query command is received at the media output port 250, determine whether the media output port 250 is coupled to a sink device or another media switch device 200*a*.

In one embodiment, the command switching and control module 210 may include a control unit 212, a command switching unit 214, and a channel switching unit 216. The command switching unit 214 is coupled to the media input ports 230 and the media output port 250, and the channel switching unit 216 is coupled to the media input/extension composite port 240 and the command switching unit 214. The control unit 212 is coupled to the command switching unit 214, the channel switching unit 216 and the video switching unit 220, for controlling the switching operations of the command switching unit 214, the channel switching unit 216 and the video switching unit 220.

The control unit 212 is also coupled to the media output port 250, to receive the query command from the media output port 250 or transmit the response command to the media output port 250. Further, the control unit 212 controls the channel switching unit 216 to switch to the control unit 212, to receive the response command from the media input/extension composite port 240 or transmit the query command to the media input/extension composite port 240.

In this embodiment, the media switch devices 200 have a normal operating mode and a query/response operating mode. In the normal operating mode, the media switch devices 200 transmit media signals normally. In the query/response operating mode, the media switch devices 200 determine their relative connection relationships via query and response commands. Taking the media switch device 200*b* as an example, in the normal operating mode, the control unit 212 controls the switching of the channel switching unit 216, to make a signal connection between the media input/extension composite port 240 and the command switching unit 214. This way, the media signals received from one of the media input ports 230 or the media input/extension composite port 240 can be transmitted to the media output port 250 by the switching of the video switching unit 220 and the command switching unit 214.

In the query/response operating mode, the control unit 212 controls the switching of the channel switching unit 216, to make a signal connection between the media input/extension composite port 240 and the control unit 212. This way, the control unit 212 can directly transmit the query command to the media input/extension composite port 240. When the control unit 212 receives the response command from the media input/extension composite port 240, it can determine that the media input/extension composite port 240 is coupled to the media output port 250' of another media input/extension composite port 240*c* (as shown in FIG. 3). On the other hand, if the control unit 212 receives no response command from the media input/extension composite port 240, it can determine that the media input/extension composite port 240 is coupled to a source device or is not coupled to any device, i.e., it can determine that that media switch device 200 is the last one of the multiple serial-connected media switch devices.

Similarly, when the control unit 212 receives a query command via the media output port 250, it can determine that the media output port 250 is coupled to the media input/extension composite port 240' of another media switch device 200*a* (as shown in FIG. 3). The control unit 212 can subsequently transmits the response command via the media output port 250 to the media switch device 200*a*. On the other hand, if the control unit 212 receives no query command via the media output port 250, it can determine that the media output port 250 is coupled to a sink device or not coupled to any device, i.e., it can determine that that media switch device 200 is the first one of the multiple serial-connected media switch devices.

In this embodiment, the media switch device 200 may be an HDMI switch. Take the media switch device 200*b* as an example, the video switching unit 220 may be a TMDS switch which switches the transmission path of the TMDS signal, and the command switching unit 214 may be a CEC switch which switches the transmission path of the CEC signal.

In the normal operating mode, the CEC channel transmits the CEC signal defined by the HDMI specification. In the query/response operating mode, the embodiment of the present invention temporarily "borrows" the control of the CEC channel, and uses it to transmit the query and response commands that are defined by the embodiment, to enable the multiple media switch devices 200 to determine the relative relationships among themselves. After the determination is completed (described in more detail later), the operating mode is changed from the query/response mode back to the normal mode, so the signal transmission on the CEC channel goes back to the normal operation.

Although in this embodiment, the command switching unit 214 is a CEC switch, so as to transmit the query and response commands on the CEC channel, the invention is not limited to using the CEC channel. For example, the command switching unit 214 may alternatively be an I$^2$C switch, so that the commands can be transmitted over the DDC channel. The command switching unit 214 may alternatively be a HPD switch, so that the commands can be transmitted over the HPD channel. But care should be taken that, when the commands are transmitted over the HPD channel, because a device will be deemed to have been unplugged when the detected voltage has been at the low voltage level for over 100 ms, the total time used to transmit the query command and the response command should be less than 100 ms each time, to avoid creating an "unplugged" determination by the media switch device which may cause the sink device to become a blank screen. If the commands are transmitted over the DDC channel, the property of the I$^2$C signal may be used to give the command switching unit 214 a virtual address. Based on the disclosure here, those skilled in the art will be readily able to adjust the structure or operation of the command switching and control module 210 accordingly. These are all within the scope of the present invention.

The operation of the query and response commands is described in detail below using the embodiments of FIGS. 2 and 3. When the media switch devices 200 are initially connected in series, they are changed into the query/response operating mode. Also, a media switch device 200 will change to the query/response operating mode when it receives a query command from another media switch device 200. Using the media switch system 300 of FIG. 3 as an example, when the media switch devices 200 (200*a*, 200*b*, 200*c*) are initially connected in series, the media switch devices 200 performs initial setting when they will enter the query/response mode.

First, each media switch device 200 transmits a predefined query command via its media input/extension composite port. The predefined query command may be, for example, a command that inquires whether the receiving device is a media switch device. When a media switch device 200 receives such a query command, it transmits, via its media output port, a response command containing information about its current connection state. The response command includes a number which is equal to the number of all other media switch devices coupled downstream of the media input/extension composite port of the current media switch device plus 1 (the current media switch device 200 itself), as well as a number which is equal to the number of media input ports of all other downstream media switch devices plus the number of media input ports of the current media switch device. For the media switch device 200 that receives the response command, the response command received includes the number of all media switch devices downstream of the media input/extension composite port of the current switch and the corresponding number of all downstream media input ports.

For example, for media switch device 200c, because it has no downstream media switch devices, after it transmits the query command, it will receive no response command from its media input/extension composite port. Therefore, the media switch device 200c determines that it is the last one of the serial connected media switch devices, that the number of downstream media switch devices coupled downstream of its media input/extension composite port is 0, and that the number of downstream media input ports is also 0. Also, because the media input/extension composite port of the media switch device 200c is not coupled to another media switch device, the actual number of useable media input ports for the media switch device 200c is 4 (3 media input ports plus 1 media input/extension composite port). Useable media input ports are ports that can be used to connect to source devices.

When the media switch device 200c received the query command from the media switch device 200b, the media switch device 200c transmits back to media switch device 200b a response command that contains information about the connection relationship downstream of it and itself. For example, the content of this response command may be (SW:1 Port: 4), where "SW:1" means that there is 1 (0+1) media switch device including the media switch device 200c itself, and "Port:4" means that there are 4 (0+4) useable media input ports including those of the media switch device 200c itself.

When the media switch device 200b receives the response command such as one having the content (SW:1 Port:4), for the media switch device 200b, the number of media switch devices connected downstream of its media input/extension composite port 240 is 1 (i.e. the media switch device 200c), and the corresponding number of downstream media input ports is 4. So, when the media switch device 200b receives a query command from the media switch device 200a, the media switch device 200b transmits to the media switch device 200a a response command, which contains information about the connection relationship of its downstream media switch devices plus itself, i.e., in this example, (SW:2 Port:7). Here "SW:2" means there are 2 (1+1) media switch devices including media switch device 200b itself, and "Port:7" means that there are 7 (4+3) useable media input ports including those of the media switch device 200b itself.

When the media switch device 200a receives the response command such as one having the content (SW:2 Port:7), for the media switch device 200a, the number of media switch devices connected downstream of its media input/extension composite port 240' is 2 (i.e. the media switch devices 200b and 200c), and the corresponding number of useable downstream media input ports is 7. Because the media switch device 200 has no other media switch device connected upstream of it, it will receive no query command on its media output port, so the media switch device 200c determines that it is the first one of the serial connected media switch devices.

It should be noted that the above described query and response commands may be performed once or multiple times to complete the determination of the connection relationship of the entire system. Using the media switch system 300 of FIG. 3 as an example, when the multiple media switch devices 200 are initially connected in series, each media switch device 200a, 200b and 200c will transmit a query command via its media input/extension composite port. Take the media switch device 200b as an example, during the time period after the media switch device 200b has sent a query command but before it receives the response command from the media switch device 200c, the media switch device 200b will temporarily determine that it is the last one of the serial connected media switch devices (similar to what occurs in the media switch device 200c described earlier). During this time period, if the media switch device 200b receives a query command from the media switch device 200a, the media switch device 200b will transmits a response command based on its current connection state to media switch device 200a, and similar to what occurs in the media switch device 200c described earlier, the response command will be (SW:1 Port:4).

Later, after the media switch device 200b receives the response command from the media switch device 200c, the response command being (SW:1 Port:4), the media switch device 200c updates its own connection state. After that, when the media switch device 200b again receives a query command from the media switch device 200a, the media switch device 200b will transmit a response command reflecting its updated connection state, i.e., (SW:2 Port:7), to the media switch device 200a (similar to the earlier described step regarding media switch device 200b). Thus, in the query/response operating mode, all the media switch devices 200 will intermittently transmit query commands for example at intervals of 100 ms or longer. Whenever a media switch device 200 receives a response command that has changed from the previous response command, it will update its own connection state; thereafter when it receives additional query commands, it will transmit the updated connection state in the response command. This way, after a period of time, the response commands received by all media switch devices 200 will stop changing; the determination of the connection relationships of the media switch devices 200 of the system is now complete, and the media switch devices can now be switched to the normal operating mode. In one embodiment, each media switch device 200 is set so that after it receives a predetermined number (e.g., 10) consecutive response commands that have the same content, it will conclude the query/response mode and switch to the normal operating mode. It should be noted that the invention is not limited to the above-described criteria and manner of switching between the query/command operating mode and the normal operating mode; those skilled in the art can readily implement other suitable criteria and manner of changing the operating mode.

Referring again to FIGS. 2 and 3, after the system completes the determination of connection relationship and switches to normal operating mode, the user can use a single remote control device (such as the remote control 140) to remotely control the entire media switch system 300 to switch the input to a desired input port. It is noted that during the query/command operating mode, because the media switch device 200*a* receives no query commands at its media output port, it determines itself to be the first one of the serial connected media switch devices, i.e., the master media switch device. Thereafter, only the master media switch device 200*a* will process the control commands received from the remote control device. Correspondingly, because media switch device 200*b* and media switch device 200*c* both received query commands at their respective media output port, they will determine themselves not to be the first one of the serial connected media switch devices, i.e., they are slave media switch devices. Thereafter, these slave media switch devices 200*b* and 200*c* will ignore the control commands received from the remote control device, and only process control commands received at their respective media output ports.

Figure 4:
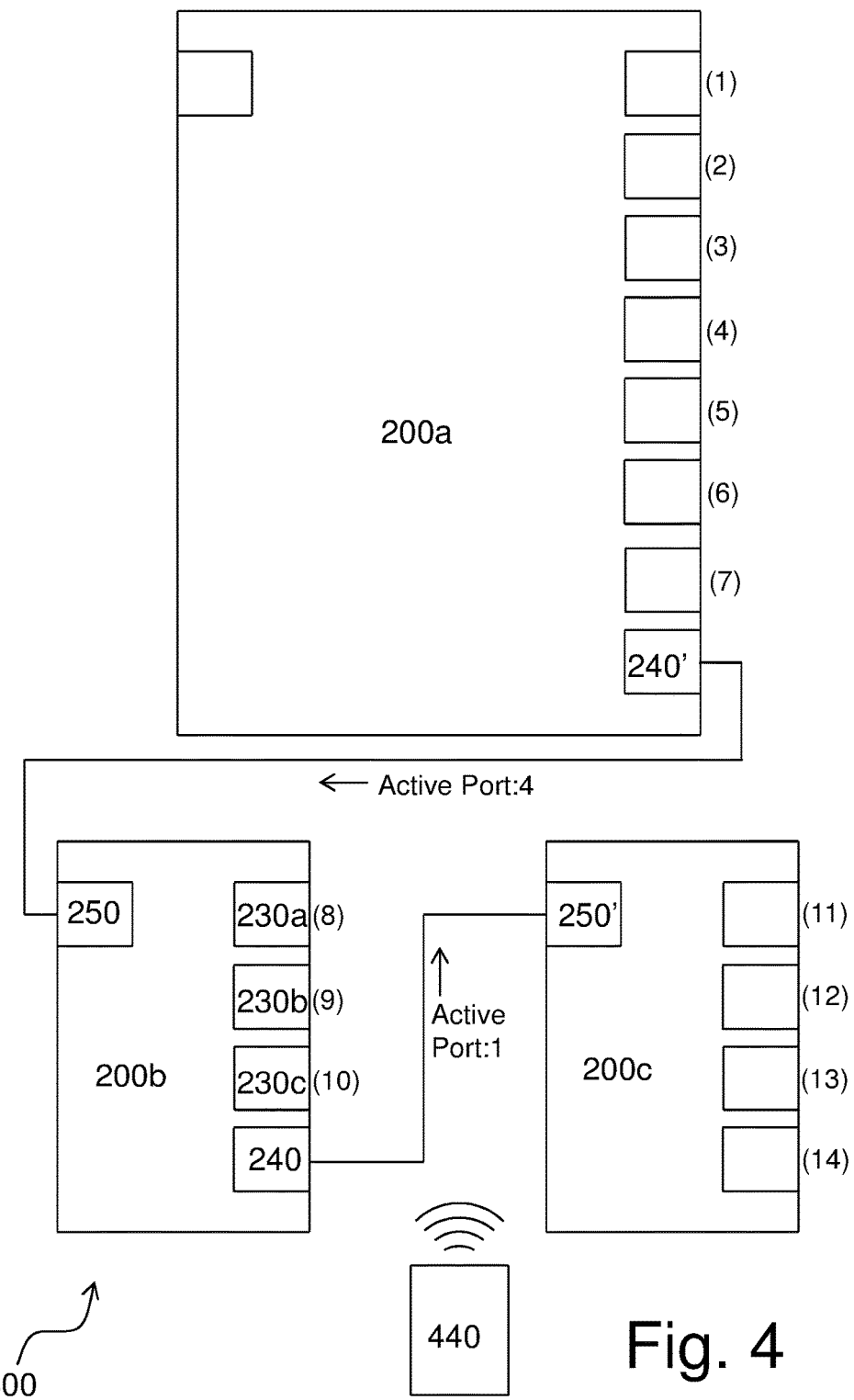
FIG. 4 illustrates an operation of the media switch system of FIG. 3 using a remote control device according to an embodiment of the present invention.

FIG. 4 illustrates the operation of the media switch system of FIG. 3 using a remote control device according to an embodiment of the present invention. As shown in FIG. 4, when the media switch device 200*a* receives a response command such as (SW:2 Port:7), the media switch device 200*a* determines that there are a total of 3 (2+1) serial connected media switch devices including itself, and there are a total of 14 (7+7) useable media input ports including its own ones. For convenience of explanation, these useable media input ports are serially labeled input port (1), (2), (3), . . . (14), as shown in FIG. 4 where the labels are depicted next to the input ports. The invention is not limited to this labeling scheme. Further, the media switch device 200*b* determines that there are 2 serial connected media switch devices including itself and those downstream of it, and 7 useable media input ports including its own and those downstream of it. Thus, for the media switch device 200*b*, these 7 useable media input ports may also be sequentially labeled, and respectively corresponding to the input port (8), (9), (10), . . . (14) from the standpoint of the media switch device 200*a*. Similarly, the media switch device 200*c* determines that it is the last serial connected media switch device, and there are 4 useable media input ports including its own media input ports and its own media input/extension composite port. Thus, for the media switch device 200*c*, these 4 useable media input ports may also be sequentially labeled, and respectively corresponding to the input port (11), (12), (13), (14) from the standpoint of the media switch device 200*a*.

The query/response operating mode typically initially sets the first useable input port (1) of the series as the active input port, although the invention is not limited to such. When the user desires to change the active input port from input port (1) to input port (2), the user presses the "up" key (e.g. key 144*a*) on the remote control 440. The remote control 440 transmits a control command, e.g. (Active Port:+1), to command the media switch system 300 to switch from the current input port "up" by one to another input port. The media switch devices 200*b* and 200*c* will ignore this control command, and only the media switch device 200*a* will process this control command. First, the media switch device 200*a* translates the control command (Active Port:+1) received from the remote control 440 based on the current active input port number, i.e., (1+1); i.e., in this example, the media switch device 200*a* determines that the active input port is to be changed from the current active input port (1) to input port (2). In other words, the media switch device 200*a* translates the control command into (Active Port:2), i.e., the active port serial number is 2. Because this active port serial number is smaller than or equal to the number of useable input ports on media switch device 200*a* itself (i.e. the number of media input ports on the media switch device 200*a*), i.e. 2≤7, the control unit of the media switch device 200*a* (not shown in FIG. 4) determines that this control command is applicable to the media switch device 200*a* itself, and correspondingly makes a signal connection between its media output port and its media input port (2).

In another example, assume that the media input ports 230*c* corresponding to input port (10) is currently active, i.e., the media input/extension composite port 240' is currently connected and the media input ports 230*c* (10) is currently connected, and the user uses the remote control device 440 to transmit a control command (Active Port:+1). In similar manner as described earlier, when the media switch device 200*a* receives such a command, it interprets it to (10+1), and determines that the active input port is to be changed from the current active input port (10) to input port (11). So the interpreted control command is (Active Port:11), i.e., the active port serial number is (11). Because this active port serial number is greater than the number of useable input ports on the media switch device 200*a* itself (11>7), the control unit of the media switch device 200*a* (not shown in FIG. 4) determines that this control command is inapplicable to the media switch device 200*a* itself. Thus, the media switch device 200*a* derives a processed active port serial number by subtracting the number of useable input ports of itself, i.e. the processed active port serial number is now 11−7=4. So the processed control command becomes (Active Port:4). Then, the media switch device 200*a* transmits this processed control command (Active Port:4) via its media input/extension composite port 240' to its downstream media switch device 200*b*.

The media switch device 200*b*, after receiving the processed control command such as (Active Port:4) from its upstream media switch device 200*a*, determines that the active port serial number is 4, and compares this serial number to the number of useable input ports on itself. Because the active port serial number is greater than the number of useable input ports of the media switch device 200*b* itself (which is the number of media input ports of the media switch device 200*b*), i.e., 4>3, the control unit 212 of the media switch device 200*b* determines that this control command is inapplicable to media switch device 200*b* itself. Then, the media switch device 200 derives a new processed active port serial number by subtracting the number of useable input ports of itself, i.e. the processed active port serial number is now 4−3=1. So the processed control command now becomes (Active Port:1). Then, the media switch device 200*b* switches to its media input/extension composite port 240, and transmits the processed control command (Active Port:1) via the media input/extension composite port 240 to its downstream media switch device 200*c*.

The media switch device 200*c*, after receiving the processed control command such as (Active Port:4) from its upstream media switch device 200*b*, determines that the active port serial number is 1, and compares this serial number to the number of useable input ports on itself. Because the active port serial number is smaller than the number of useable input ports on the media switch device 200*c* itself (which is the number of media input ports plus the media input/extension composite port on the media switch device 200*c*), i.e., 1≤4, the control unit (not shown in FIG. 4) of the media switch device 200*c* determines that this control command is applicable to the media switch device 200*c* itself. From the standpoint of the media switch device 200*c*, the 4 useable input ports are respectively input ports labeled (11)-(14), i.e., input port labeled (11) is the first useable input port of the media switch device 200c. Therefore, the media switch device 200c makes a signal connection between its media output port and the media input port labeled (11).

To summarize, for each media switch device, when it receives a control command, its control unit determines whether the control command is applicable to the media switch device itself. If it is, the control unit controls the switching of the video switching unit and the command switching unit, to make a signal connection between the media output port and the appropriate media input port. On the other hand, if the control command is inapplicable to the media switch device itself, the control unit controls the switching of the video switching unit and the command switching unit, to make a signal connection between the media output port and the media input/extension composite port; the control unit processes the control command and transmits the processed control command via the media input/extension composite port to the next downstream media switch device.

More specifically, the control unit compares the active port serial number in the control command with the number of useable input ports of the media switch device itself, to determine whether the control command is applicable to the media switch device itself. When the media switch device is not the last one of the serial connected media switch devices, its number of useable input ports is the number of input ports on itself; and when the media switch device is the last one of the serial connected media switch devices, its number of useable input ports is the number of media input ports on itself plus 1 (i.e., its media input/extension composite port can be used as an input port). For clarity of explanation, unless otherwise specified, a media switch device mentioned here is not the last one of the serial connected media switch devices; those skilled in the art will readily appreciate that for the last one of the serial connected media switch devices, its media input/extension composite port is used as an input port, so its number of useable input port is its number of media input ports plus 1.

When the active port serial number is smaller than or equal to the number of media input ports of the media switch device, it is determined that the control command is applicable to this media switch device. On the other hand, when the active port serial number is greater than the number of media input ports of the media switch device, it is determined that the control command is inapplicable to this media switch device, so the control unit will generate a processed control command by subtracting the number of its media input ports from the active port serial number.

In the overall system configuration and remote control method of the embodiments, even though each media switch device can only determine the number of media switch devices including itself and those downstream of its media input/extension composite port, and the number of useable input ports including its own and those downstream of its media input/extension composite port, by using the control commands defined in the embodiments, each media switch device can determine whether the control command is applicable to itself. If it is inapplicable to itself, the media switch device will adjust the control command by appropriately subtracting the number of its own input ports, and transmit the adjusted control command to the next downstream media switch device. Ultimately the control command will be applied to one media switch device, so that the media switch system can be switched to the desired input port. By this remote control method, each media switch device does not need to determine the total number of media switch devices in the whole system, and still the single remote control device can be used to control the system to switch to the desired input port. Compared to the method used by CEC, which uses a broadcast method to look for each media switch device, the system configuration and remote control method of embodiments of the present invention is simpler and more convenient to use.

In these embodiments, the remote control device 440 may be the same as the remote control device 140, and can transmit "up" and "down" control commands. Thus, the above described remote control method can be achieved without having to perform any additional setting for the remote control device. Additionally, to provide the user with a more efficient and convenient switching method, another embodiment of the present invention provide a control method using another remote control device, as described below.

Figure 5:
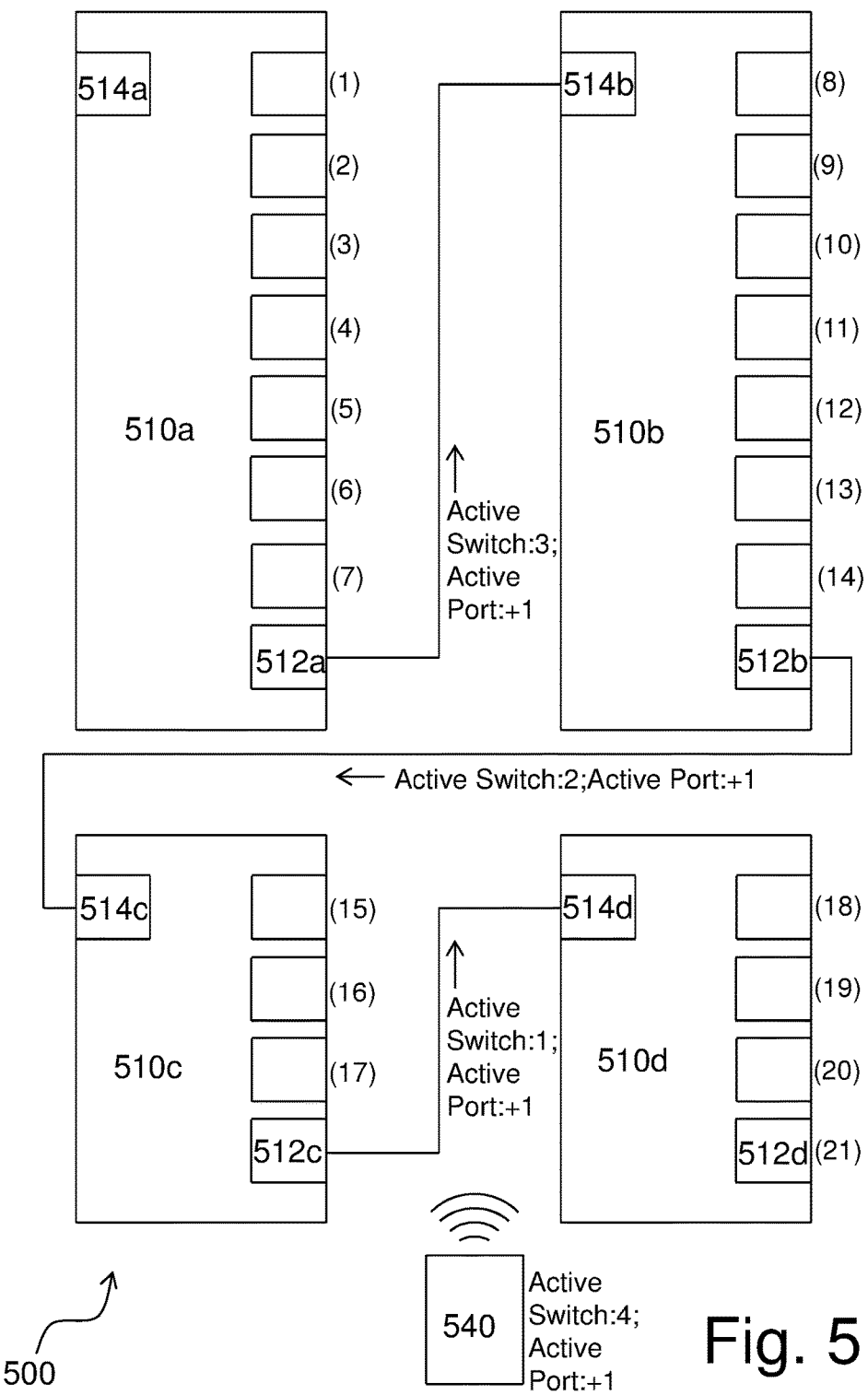
FIG. 5 illustrates an operation of a media switch system using a remote control device according to another embodiment of the present invention.

FIG. 5 illustrates the operation of a media switch system using a remote control device according to another embodiment of the present invention. As shown in FIG. 5, the media switch system 500 includes multiple serial connected media switch device 510 (510a, 510b, 510c, 510d). Each media switch device 510 has the same structure as the media switch device 200b shown in FIG. 2. The media input/extension composite ports 512 (512a, 512b, 512c) of the media switch devices 510 (510a, 510b, 510c) are respectively coupled to the media output ports 514 (514b, 514c, 514d) of the downstream media switch devices 510 (510b, 510c, 510d). To avoid overcrowding, the internal structures of the media switch devices 510 are not depicted in FIG. 5.

Similar to the earlier described embodiment, because the media switch device 510a will receive no query command at its media output port 514a, it will determine itself as the first one of the serial connected media switch devices. Similarly, because the media switch device 510d will receive no response commands at its media input/extension composite port 512d, it will determine itself as the last one of the serial connected media switch devices. Further, via the transmission of the response commands by various media switch devices, the media switch device 510a eventually determines that there are a total of 4 serial connected media switch devices including itself, and a total of 21 useable input ports including its own. For convenience of illustration, these useable input ports are labeled sequentially as (1), (2), (3), . . . (21) as shown next to the input ports in FIG. 5, where the input port (21) is the media input/extension composite port 512d of the last media switch device 510d.

The user may use the remote control device 540 to remotely control the media switch system 500. The remote control device 540 has an interface similar to that of the remote control 140 shown in FIG. 1B, but the keys 142 (142a, 142b, 142c, 142d) no longer correspond to media input ports; rather, they correspond to the media switch devices 510 (510a, 510b, 510c, 510d). Further, the keys 144 (144a, 144b) are still "up" and "down" keys for switching the media input ports. The command transmitted by the remote control device 540 may be, for example, (Active Switch:2; Active Port:+1), indicating that the on the second media switch device, the active input port is switched "up" by 1 to another input port. Here, the active switch serial number is 2, and the active port increase/decrease number is +1.

Under such a setting, the remote control device 540 needs information of two key presses to generate and transmit a control command. In this embodiment, the key 144 is used as a trigger key to transmit the control command. When the user presses a key 142, the remote control device 540 stores the information about the media switch device 510 corresponding to the pressed key 142, but does not transmit a control command. When the user then presses a key 144, the remote control device 540 combines the information represented by the pressed key 144 and the previously pressed key 142 to form a control command, and transmits this control command to the media switch system 500. It should be noted that the invention is not limited to this particular key trigger method of the remote control device 540; alternatively, for example, it may use a key 142 as a trigger, or both a key 142 and a key 144 may be used as a trigger.

In one example, assume that the current active input port of the media switch system 500 is (10), i.e., the media switch device 510a is switched to the media input/extension composite port 512a and the media switch device 510b is switched to the input port (10), to make a signal connection to the source connected to the input port (10). It should be noted that, although media switch device 510c and media switch device 510d are not involved with the current switching operation, they store their respective previous switching state, e.g., in this example, they were previous switched to input ports (16) and (19), respectively.

When the user wishes to switch to input port (20), the user first presses key 142d and then presses key 144a, so the remote control device 540 transmits a control command (Active Switch:4; Active Port:+1) to the media switch system 500. This commands intends to switch "up" one port on the fourth media switch device (media switch device 510d). Initially, when the media switch device 510a receives the control command from the remote control device 540, because the active switch serial number is greater than 1 (4>1), it determines that the control command is inapplicable to this media switch device 510a. Then, the control unit of the media switch device 510a (not shown in FIG. 5) subtracts 1 from the active switch serial number to derive a processed active switch serial number (4−1=3), and transmits the processed control command (Active Switch:3; Active Port:+1) via the media input/extension composite port 512a to the media switch device 510b.

Then, when the media switch device 510b receives the control command from the media switch device 510a, because the active switch serial number is greater than 1 (3>1), it determines that the control command is inapplicable to this media switch device 510b. Then, the control unit of the media switch device 510b (not shown in FIG. 5) subtracts 1 from the active switch serial number to derive a processed active switch serial number (3−1=2), switches its input from input port (10) to the media input/extension composite port 512b, and transmits the processed control command (Active Switch:2; Active Port:+1) via the media input/extension composite port 512b to the media switch device 510c. It should be noted that the media switch device 510b still stores its switching state before it switched to media input/extension composite port 512b, i.e., input port (10).

Similarly, when the media switch device 510c receives the control command from the media switch device 510b, because the active switch serial number is greater than 1 (2>1), it determines that the control command is inapplicable to this media switch device 510c. Then, the control unit of the media switch device 510c (not shown in FIG. 5) subtracts 1 from the active switch serial number to derive a processed active switch serial number (2−1=1), switches its input from input port (16) to the media input/extension composite port 512c, and transmits the processed control command (Active Switch:1; Active Port:+1) via the media input/extension composite port 512c to the media switch device 510d. It should be noted that the media switch device 510c still stores its switching state before it switched to media input/extension composite port 512c, i.e., input port (16).

Lastly, when the media switch device 510d receives the control command from the media switch device 510c, because the active switch serial number is equal to 1, it determines that the control command is applicable to this media switch device 510d. Then, the control unit of the media switch device 510d (not shown in FIG. 5) switches its input based on the active port increase/decrease number (+1) in the control command, i.e., it switches to input port (20) from input port (19), to make a signal connection to the source device at the input port (20).

In summary, in this embodiment, when a media switch device receives a control command, it analyzes the active switch serial number and the active port increase/decrease number in the command. If the active switch serial number is greater than 1, it determines that the control command is inapplicable to this media switch device; the control unit then subtracts 1 from the active switch serial number to generate a processed control command, and transmits the processed control command to its downstream media switch device. On the other hand, if the active switch serial number is 1, it determines that the control command is applicable to this media switch device; the control unit determines the switching of its input port based on the active port increase/decrease number. When a long series of media switch devices are connected together, this switching method can quickly switch to the appropriate media switch device and then switch the input port on that media switch device, reducing switching time.

It should be noted that in this switching method, within each individual media switch device, the input port switching uses a circular switching method. In another example, assume that the current switching state of the media switch system 500 is input port (1), i.e., the media switch device 510a has a signal connection to the source device at input port (1). When the media switch device 510a receives from the remote control device 540 a control command such as (Active Switch:1; Active Port:−1), because the active switch serial number is 1, it determines that the control command is applicable to this media switch device 510a. Then, based on the active port increase/decrease number (−1), the media switch device 510a switches its input port from input (1) to input port (7).

Figure 6:
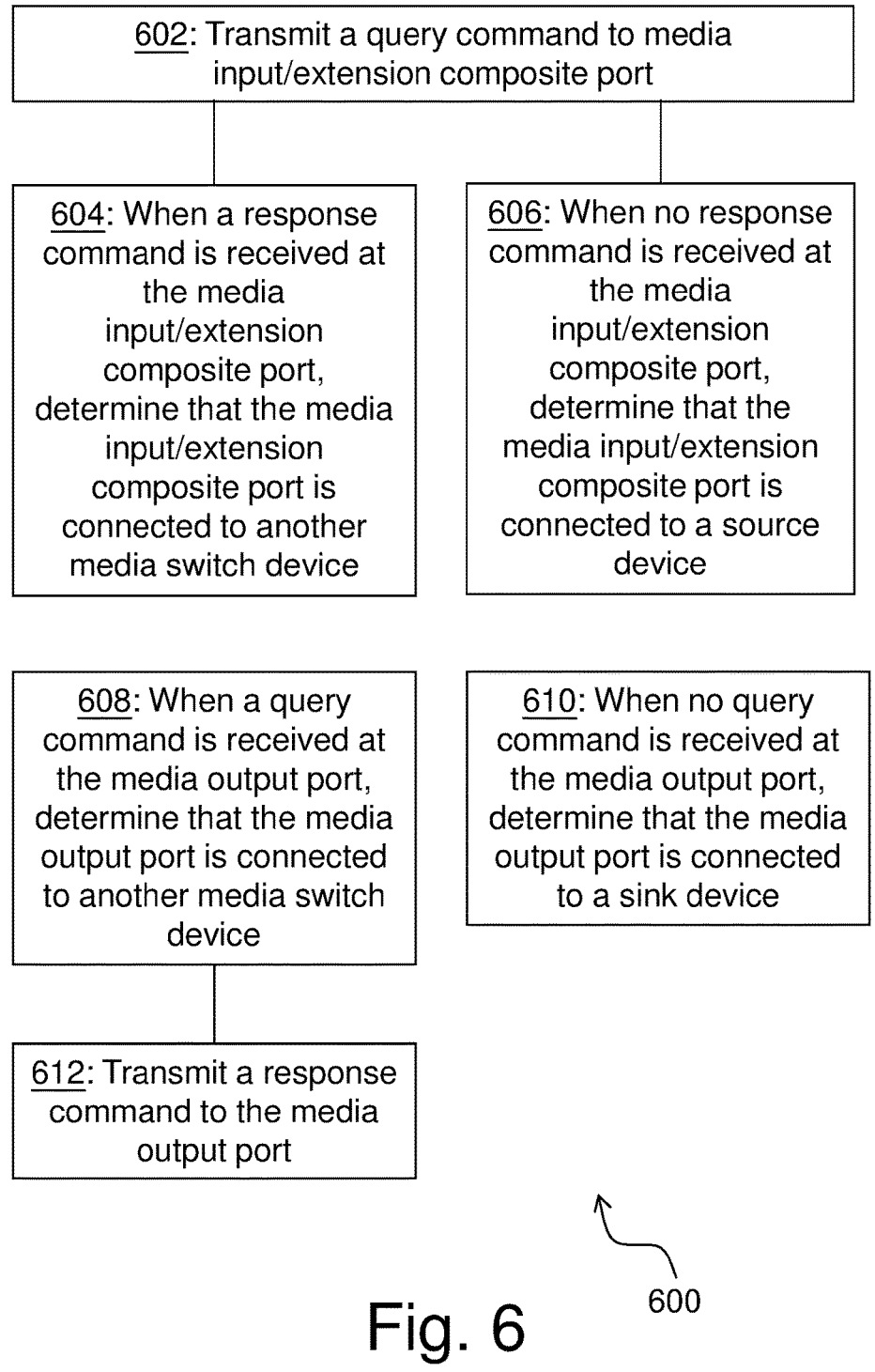
FIG. 6 is a flow chart illustrating a media switching method according to an embodiment of the present invention.

FIG. 6 is a flow chart illustrating a media switching method according to an embodiment of the present invention. The media switching method 600 can be performed by an above-described media switch device (such as the media switch device 200) or media switch system (such as media switch system 300 or 500), to determine the relative connection relationship among the media switch devices. Referring to FIG. 6, when determining whether the media switch device is connected at its media input/extension composite port to another media switch device or to a source device, first, in step 602, the media switch device transmits a query command to the media input/extension composite port. In step 604, when it receives a response command at the media input/extension composite port, it determines that the media input/extension composite port is connected to another media switch device. On the other hand, in step 606, if it receives no response command at the media input/extension composite port, it determines that the media input/extension composite port is connected to a source device.

When determining whether the media switch device is connected at its media output port to another media switch device or to a sink device, the media switch device bases the determination on whether a query command is received. In step 608, when it receives a query command at the media output port, it determines that the media output port is connected to another media switch device. On the other hand, in step 610, if it receives no query command at the media output port, it determines that the media output port is connected to a sink device. Further, after step 608, in step 612, it transmits a response command to the media output port; as described earlier, the response command includes a number which is equal to the number of all other media switch devices coupled downstream of its media input/extension composite port plus 1, and a number which equals to the number of media input ports of all other downstream media switch devices plus the number of its own media input ports.

Figure 7:
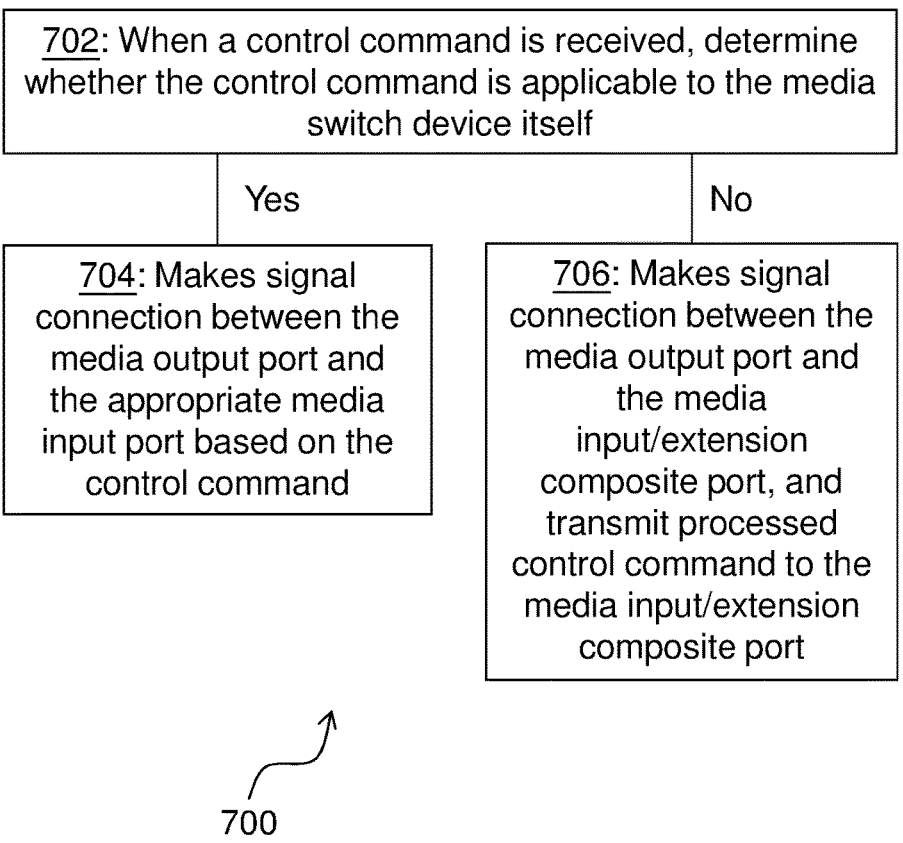
FIG. 7 is a flow chart illustrating a media switching method according to another embodiment of the present invention.

FIG. 7 is a flow chart illustrating a media switching method according to another embodiment of the present invention. The media switching method 700 can be performed by an above-described media switch device (such as the media switch device 200) or media switch system (such as media switch system 300 or 500), to switch the system to a desired input port. Referring to FIG. 7, in step 702, when the media switch device receives a control command, it determines whether the control command is applicable to itself. In step 704, when it determines that the control command is applicable to itself, it makes a signal connection between the media output port and the appropriate media input port based on the control command. On the other hand, in step 706, when it determines that the control command is inapplicable to itself, it makes a signal connection between the media output port and the media input/extension composite port, and transmits a processed control command to the media input/extension composite port.

It will be apparent to those skilled in the art that various modification and variations can be made in the media switch device, system and method of the present invention without departing from the spirit or scope of the invention. Thus, it is intended that the present invention cover modifications and variations that come within the scope of the appended claims and their equivalents.

LIST OF REFERENCE SYMBOLS

50, 501, 50*b*, 50*c*, 50*d*: source device
60: sink device
100: media switch device
110: switching unit
120: media output port
130, 130*a*, 130*b*, 130*c*, 130*d*: media input port
140, 440, 540: remote control device
142, 142*a*, 142*b*, 142*c*, 142*d*, 144, 144*a*, 144*b*: key
200, 200*a*, 200*b*, 200*c*, 510, 510*a*, 510*b*, 510*c*, 510*d*: media switch device
300, 500: media switch system
210: command switching and control module
212: control unit
214: command switching unit
216: channel switching unit
220: video switching unit
230, 230*a*, 230*b*, 230*c*: media input port
240, 240', 512, 512*a*, 512*b*, 512*c*, 512*d*: media input/extension composite port
250, 250', 514, 514*a*, 514*b*, 514*c*, 514*d*: media output port
600, 700: media switching method
602, 604, 606, 608, 610, 612, 702, 704, 706: step
(1), (2), (3), . . . (21): input port

What is claimed is:

1. A media switching method, implemented in a media switch device, the media switch device comprising at least one media input port, a media input/extension composite port, and a media output port, the media input/extension composite port configured to be coupled to either a source device or to another media switch device, the media output port configured to be coupled to either a sink device or to yet another media switch device, the at least one media input port each configured to be coupled to a source device, the media switching method comprising:
   receiving a response command from the media input/extension composite port to determine whether the media input/extension composite port is coupled to a source device or another media switch device; and
   receiving a query command from the media output port to determine whether the media output port is coupled to a sink device or yet another media switch device.

2. The media switching method of claim 1, further comprising transmitting a query command to the media input/extension composite port;
   wherein when a response command is received from the media input/extension composite port, the media input/extension composite port is determined to be coupled to another media switch device; and
   wherein when no response command is received from the media input/extension composite port, the media input/extension composite port is determined to be coupled to a source device.

3. The media switching method of claim 2, wherein when the response command is received from the media input/extension composite port, the response command includes a first number representing a number of all downstream media switch devices coupled downstream of the media input/extension composite port and a second number representing a number of media input ports of all the downstream media switch devices.

4. The media switching method of claim 1,
   wherein when the query command is received from the media output port, the media output port is determined to be coupled to another media switch device; and
   wherein when the no query command is received from the media output port, the media output port is determined to be coupled to a sink device.

5. The media switching method of claim 4, further comprising, after the query command is received from the media output port, transmitting a response command to the media output port, the response command including a first number which is equal to a number of all downstream media switch devices coupled downstream of the media input/extension composite port plus 1, and a second number which is equal to a number of media input ports of all the downstream media switch devices plus a number of the at least one media input port of the media switch device.

6. The media switching method of claim 1, wherein in a query/response mode:
   when no query command is received from the media output port, determining the media switch device to be a master media switch device, and subsequently, when a control command is received from a remote control device, processing the control command from the remote control device; and
   when the query command is received from the media output port, determining the media switch device to be a slave media switch device, and subsequently, when a control command is received from the remote control device, ignoring the control command from the remote control device, and processing a control command received from the media output port.

7. The media switching method of claim 6, wherein the processing of the control command comprises:
   determining whether the control command is applicable to the media switch device;
   when the control command is determined to be applicable to the media switch device, forming a signal connection between the media output port and one of the at least one media input port specified in the control command; and
   when the control command is determined to be inapplicable to the media switch device, forming a signal connection between the media output port and the media input/extension composite port, and processing the control command and transmitting the processed control command to the media input/extension composite port.

8. The media switching method of claim 7, wherein the processing of the control command comprises:
   comparing an active port serial number in the control command with a number of the at least one media input port;
   when the active port serial number is smaller than or equal to the number of the at least one media input port, determining the control command to be applicable to the media switch device; and
   when the active port serial number is greater than the number of the at least one media input port, determining the control command to be inapplicable to the media switch device, and subtracting the number of the at least one media input port from the active port serial number to generate the processed control command.

9. The media switching method of claim 7, wherein the processing of the control command comprises:
   analyzing an active switch serial number and an active port increase/decrease number in the control command;
   when the active switch serial number is greater than 1, determining the control command to be inapplicable to the media switch device, and subtracting 1 from the active switch serial number to generate the processed control command; and
   when the active switch serial number is equal to 1, determining the control command to be applicable to the media switch device, and determining a corresponding media input port based on the active port increase/decrease number.

* * * * *